United States Patent
Sethu et al.

(10) Patent No.: US 11,862,024 B2
(45) Date of Patent: Jan. 2, 2024

(54) SYSTEM AND METHOD FOR SOFTWARE ARCHITECTURE FOR LEADER VEHICLE CAPABILITIES FOR AN ON-DEMAND AUTONOMY (ODA) SERVICE

(71) Applicant: GM GLOBAL TECHNOLOGY OPERATIONS LLC, Detroit, MI (US)

(72) Inventors: Ramesh Sethu, Troy, MI (US); Prakash Mohan Peranandam, Rochester Hills, MI (US); Arun Adiththan, Sterling Heights, MI (US); Joseph G D Ambrosio, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 17/445,078

(22) Filed: Aug. 13, 2021

(65) Prior Publication Data
US 2023/0049762 A1    Feb. 16, 2023

(51) Int. Cl.
| | |
|---|---|
| *B60W 30/14* | (2006.01) |
| *B60W 60/00* | (2020.01) |
| *G08G 1/00* | (2006.01) |
| *G06Q 50/30* | (2012.01) |
| *H04L 67/125* | (2022.01) |
| *G01C 21/34* | (2006.01) |

(52) U.S. Cl.
CPC ............ *G08G 1/22* (2013.01); *B60W 30/14* (2013.01); *B60W 60/001* (2020.02); *G01C 21/3453* (2013.01); *G06Q 50/30* (2013.01); *H04L 67/125* (2013.01); *B60W 2556/50* (2020.02); *B60W 2556/65* (2020.02)

(58) Field of Classification Search
CPC ...... G08G 1/22; B60W 30/14; B60W 60/001; B60W 2556/50; B60W 2556/65; G01C 21/3453; G06Q 50/30; H04L 67/125
See application file for complete search history.

(56) References Cited

U.S. PATENT DOCUMENTS

| | | | |
|---|---|---|---|
| 11,636,405 B2* | 4/2023 | Atanasiu | G06Q 10/047 701/533 |
| 2010/0256852 A1* | 10/2010 | Mudalige | G08G 1/164 701/24 |
| 2016/0009304 A1* | 1/2016 | Kumar | B61L 27/40 701/19 |
| 2017/0127249 A1* | 5/2017 | Li | H04L 51/214 |

(Continued)

FOREIGN PATENT DOCUMENTS

BR    112015019861 A2 *  7/2017  ............ B60W 30/16

*Primary Examiner* — Jelani A Smith
*Assistant Examiner* — Nada Mahyoob Alqaderi
(74) *Attorney, Agent, or Firm* — Lorenz & Kopf LLP

(57) ABSTRACT

Systems and methods for an On-Demand Autonomy (ODA) service. The system includes a selection module of a leader vehicle (Lv) connected to an ODA server to determine whether to confirm a request for an on-demand autonomy (ODA) service which has been broadcast wherein the ODA service request includes control of a follower vehicle (Fv) to a requested location by creating a virtual link between the Lv and the Fv to configure a vehicle platoon to enable transport of the Fv by the Lv wherein the vehicle platoon is a linking of the Lv to the Fv via the virtual link to enable the Lv to assume the control of the Fv to the requested location.

20 Claims, 8 Drawing Sheets

(56) References Cited

U.S. PATENT DOCUMENTS

| | | | |
|---|---|---|---|
| 2019/0025819 A1* | 1/2019 | Ferguson | B60W 30/12 |
| 2019/0044728 A1* | 2/2019 | Karmoose | H04L 9/0643 |
| 2019/0220037 A1* | 7/2019 | Vladimerou | G08G 1/22 |
| 2019/0349719 A1* | 11/2019 | Pattan | H04L 67/55 |
| 2021/0056852 A1* | 2/2021 | Lund | G08G 1/163 |
| 2022/0139229 A1* | 5/2022 | Hong | H04W 4/40 |
| | | | 701/26 |
| 2022/0244743 A1* | 8/2022 | Ganlath | G05D 1/0295 |
| 2023/0010974 A1* | 1/2023 | Cho | G08G 1/22 |

\* cited by examiner

SYSTEM AND METHOD FOR SOFTWARE ARCHITECTURE FOR LEADER VEHICLE CAPABILITIES FOR AN ON-DEMAND AUTONOMY (ODA) SERVICE

INTRODUCTION

The present disclosure generally relates to semi-autonomous/autonomous vehicles and more particularly relates to systems and methods for an On-Demand Autonomy (ODA) service, and yet more particularly relates to configuring leader vehicle architecture with a set of follower vehicle(s) for ODA service in autonomous/remote vehicle control.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from a positioning system including global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Accordingly, it is desirable to provide systems and methods for an On-Demand Autonomy (ODA) service that implements multiple control systems configured with software that extends a platoon configured of one or more leader vehicles (LVs) coordinated to form virtual links using a distributed protocol with at least one subordinate or follower vehicles (FVs) for guidance in an on-demand price model from one location to another for an on-demand service.

Furthermore, other desirable features and characteristics of the present invention will become apparent from the subsequent detailed description of the invention and the appended claims, taken in conjunction with the accompanying drawings and the background of the invention.

SUMMARY

A system is disclosed for an on-demand (ODA) autonomy service.

An On-Demand Autonomy (ODA) system is provided. The ODA system includes a selection module, disposed in a leader vehicle (Lv) in communication with an ODA server, configured to, by a processor, determine whether to confirm a request for an on-demand autonomy (ODA) service which has been broadcast by the ODA server to a set of Lvs, wherein the ODA service request include control of a follower vehicle (Fv) to a requested location by creating a virtual link between the Lv and the Fv to configure a vehicle platoon to enable transport of the Fv by the Lv, wherein the vehicle platoon is a linking of the Lv to the Fv via the virtual link to enable the Lv to assume the control of the Fv to the requested location; the selection module configured to, by the processor, process information broadcast from the ODA server wherein the information broadcast occurs via a distribution protocol to solicit multiple responses from the set of Lvs for creating the one virtual link between the Lv and the Fv, wherein each Lv of the set of Lvs independently decides whether to confirm the ODA service request and to create the virtual link with the Fv; the selection module configured to, by the processor, determine a value score which independently by the Lv from broadcast information that includes a cost metric of an amount provided by the ODA service for the Lv to perform the control of the Fv to the requested location wherein the value score is based on a set of factors directly associated with operation of the Lv to the ODA service request; and in response to a receipt of the value score, the selection module is configured to, by the processor, decide whether in a first instance, confirm acceptance of the ODA service request and enable the virtual link to control the Lv in the vehicle platoon to the requested location, and in a second instance, not confirm the acceptance and continue to monitor the information broadcast from the ODA server to wait for another ODA service request.

In an embodiment, the value score is based on a cost-benefit using a set of weighted factors to determine the cost metric for the Lv to control the Fv to the requested location.

In an embodiment, the system includes the selection module configured to, by the processor, receive the information broadcast from the ODA server that is divided up into one or more route segments for the control of the Fv to the requested location and include a set of solicited responses associated with the one or more route segments with the cost metric for each Lv to confirm the acceptance of the ODA service request per segment.

In an embodiment, the vehicle platoon is configured with more than one Lv when the set of solicited responses is associated with the one or more route segments to the requested location with the Lvs of the vehicle platoon changed intermittently in accordance with the one or route segments to the requested location.

In an embodiment, the Fv is at least categorized as a level two vehicle with at least capability to communicate with the ODA server, to create the virtual link with the Lv, and to relinquish navigate and the control to the Lv in the vehicle platoon.

In an embodiment, the Lv is at least categorized as the level two vehicle with at least the capability to communicate with the ODA server, to create the virtual link with the Fv, and to perform the control of the Fv to the requested location in the vehicle platoon.

In an embodiment, the virtual link between the Fv and the Lv enables the Fv to simulate a higher level of autonomous driving capability in the vehicle platoon to the requested location by reliance on the Lv for the control without the Fv having been actually configured with the higher level of autonomous driving capability.

In an embodiment, the selection module implements an intelligent model for computing the value score via the set of weighted factors for the Lv that include overhead operating costs, maneuver complexity requirements for executing the on-demand service request, the comfort level of a passenger in accordance with passenger preference, and operation time projected to occur.

A method for an On-Demand Autonomy (ODA) service is provided. The method includes configuring a selection module, disposed in a leader vehicle (Lv) in communication with an ODA server; determining, by the selection module, whether to confirm a request for the ODA service which has been broadcast by the ODA server to a set of Lvs wherein the ODA service request includes navigation and control of the Fv to a requested location by creating a virtual link between the Lv and the Fv for configuring a vehicle platoon for enabling transport of the Fv by the Lv wherein the vehicle platoon is a linking of the Lv to the Fv via the virtual link to enable the Lv to assume control of the Fv, and to navigate the Fv to the requested location; processing, by the selection module, information broadcast from the ODA server wherein the information broadcast occurs via a distribution protocol to solicit multiple responses from the set of Lvs for creating the virtual link between the Lv and Fv wherein each Lv of the set of Lvs independently decides whether to confirm the ODA service request and to create the virtual link with the Fv; determining, by the selection module, a value score independently by the Lv based on the information broadcast that provides a cost metric of an amount provided by the ODA service for the Lv to navigate and the control of the Fv to the requested location wherein the value score is based on a set of factors directly associated with operation of the Lv to the ODA service request; and deciding by the selection module whether in a first instance, for confirming acceptance of the ODA service request and enable the virtual link to navigate and the control by the Fv of the Lv in the vehicle platoon to the requested location, and in a second instance, continuing to monitor the information broadcast from the ODA server for another ODA service request.

In an embodiment, the value score is based on a cost-benefit using a plurality of weighted factors to determine a cost charge for the Lv to perform the navigation and the control of the Fv to the requested location.

In an embodiment, the method includes receiving, by the selection module, the information broadcast from the ODA server that is divided up into one or more route segments for the control and navigation of the Fv to the requested location, and includes a set of solicited responses associated with the one or more route segments with the cost metric for each Lv to confirm the acceptance of the ODA service request per segment.

In an embodiment, the vehicle platoon is configured with more than one Lv when the set of solicited responses is associated with the one or more route segments to the requested location with the Lvs of the vehicle platoon changed intermittently in accordance with the one or route segments to the requested location.

In an embodiment, the Fv is at least categorized as a level two vehicle with at least the capability to communicate with the ODA server, to create the virtual link with the Lv, and to relinquish navigation and control to the Lv in the vehicle platoon.

In an embodiment, the Lv is at least categorized as the level two vehicle with at least capability to communicate with the ODA server, to create the virtual link with Fv, to perceive surroundings of the Fv, and to perform the operation of navigating and the control of the Fv to the requested location in the vehicle platoon.

In an embodiment, the virtual link between the Fv and the Lv enables the Fv to simulate a higher level of autonomous driving capability in the vehicle platoon to the requested location by reliance on the Lv for navigation and the control without the Fv having been actually configured with the higher level of autonomous driving capability.

In an embodiment, the ODA server implements an intelligent model for computing the value score via the plurality of weighted factors for the Lv that includes overhead operating costs, maneuver complexity requirements for executing the ODA service, the comfort level of a passenger in accordance with passenger preference, and increases in operation time projected to occur.

An autonomous vehicle configured for a leader vehicle (Lv) is provided. The Lv includes a processor in communication with an On Demand Autonomy (ODA) server configured to: determine whether to confirm a request for an on-demand autonomy (ODA) service which is received via a broadcast by the ODA server to a set of Lvs wherein the ODA service request includes navigation and control of a follower vehicle (Fv) to a requested location by creating a virtual link between the Lv and the Fv to configure a vehicle platoon to enable transport of the Fv by the Lv wherein the vehicle platoon is a linking of the Lv to the Fv via the virtual link to enable the Lv to assume control of the Fv, and to navigate the Fv to the requested location; process information broadcast from the ODA server wherein the information broadcast occurs via a distribution protocol to solicit multiple responses from the set of Lvs to create the virtual link between the Lv and Fv wherein each Lv of the set of Lvs independently makes a decision whether to confirm the ODA service request and to create the virtual link with the Fv; determine a value score independently by the Lv based on the information broadcast that provides a cost metric of an amount provided by the ODA service for the Lv to perform an operation of navigating and the control of the Fv to the requested location wherein the value score is based on a set of factors associated directly with operation of the Lv to the ODA service request; and decide whether in a first instance, confirm acceptance of the ODA service request and enable the virtual link to navigate and the control by the Fv of the Lv in the vehicle platoon to the requested location, and in a second instance, continue to monitor the information broadcast from the ODA server to wait for another ODA service request.

In an embodiment, the value score is based on a cost-benefit using a plurality of weighted factors to determine a cost charge for the Lv to operate the navigation and the control of the Fv to the requested location.

In an embodiment, the autonomous vehicle further includes the processor configured to receive the information broadcast from the ODA server that is divided up into one or more route segments for the control and navigation of the Fv to the requested location and includes a set of solicited responses associated with the one or more route segments with the cost metric for the Lv to confirm the acceptance of the ODA service request per segment.

The value score is based on the cost-benefit using the plurality of weighted factors to determine the cost charge for the Lv to operate the navigation and the control of the Fv to the requested location.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
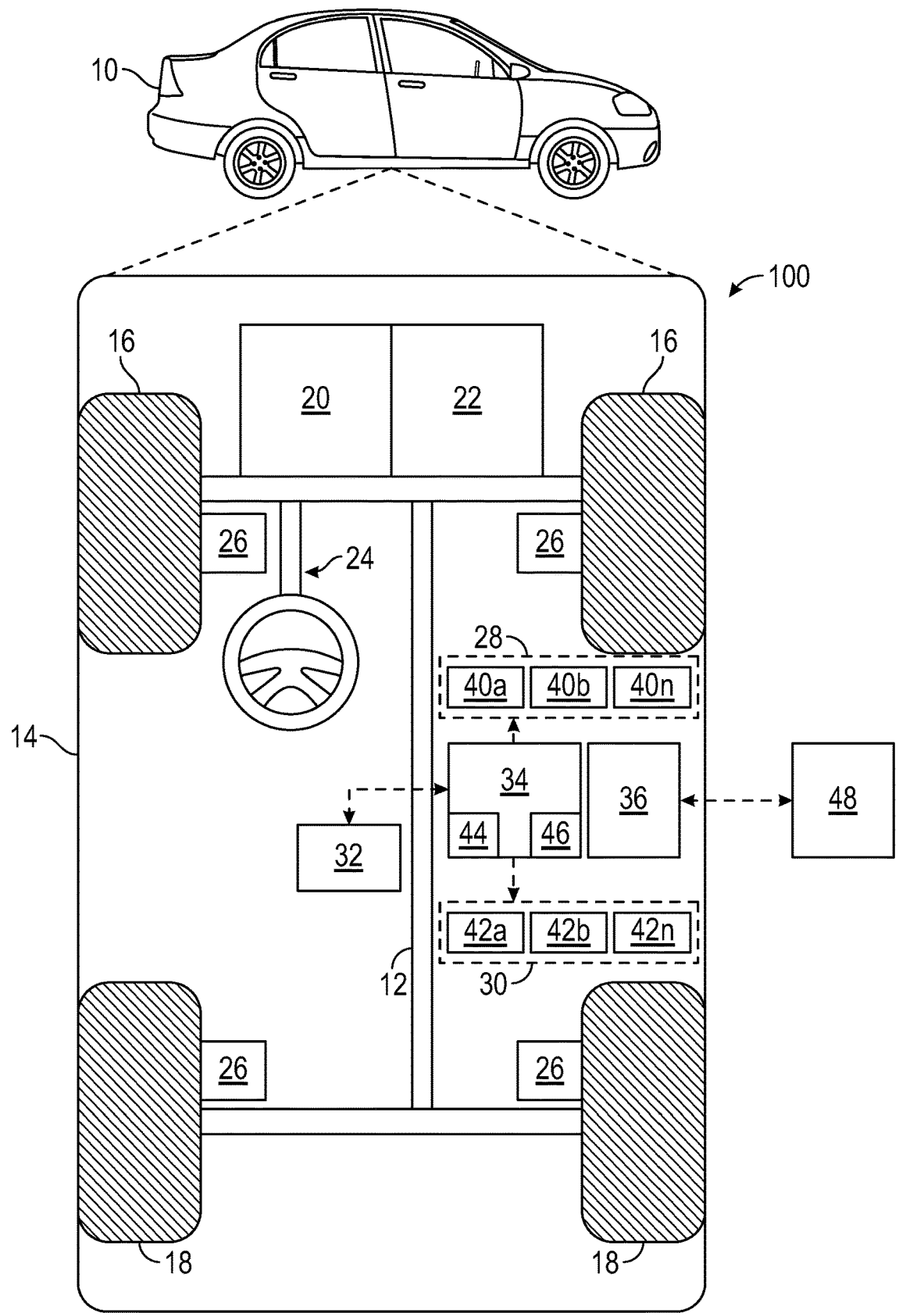
FIG. 1 is a functional block diagram illustrating an exemplary autonomous vehicle for use with the On-demand Autonomy service, in accordance with various embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application-specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various exemplary embodiments, the present disclosure provides systems and methods of an On-Demand Autonomy (ODA) service that implements one or more electronic control systems and software, built on top of a platooning service that accepts requests from other vehicles via an ODA server (ODAS), selects one or more FVs, selects one or more FVs up at pre-decided points, commands the FVs to follow a selected one of multiple LVs in a vehicle platoon for navigation, guidance, and instruction for dropping off of one or more of the FVs at various designated points.

In various exemplary embodiments, the present disclosure provides systems and methods with one or more LVs serving or instructing one or more FVs configured with enhanced overheads like increased time and resources but compensated for based on a price metric generated by the ODA service using a cost-benefit (investment) model via an intelligent algorithm based on multiple weighted factors including for the more responsibilities and increases in equipment to provide increased revenue to the selected Lv.

In various exemplary embodiments, the present disclosure provides systems and methods that enable one or more LVs to receive a request and to compute or assess independently using a utility function or model in response to the request and information provided to properly fulfill or meet the request. The Lv may determine whether to confirm the acceptance of the request using an intelligent model-based upon different parameters, e.g., route of the requests, weather, lighting, revenue, etc. and to make a selection that maximizes the parameters made available of the utility function in offering the on-demand service.

With reference to FIG. 1, an on-demand autonomy (ODA) system shown generally at 100 is associated with a vehicle 10 in accordance with various embodiments. In general, the on-demand autonomy (ODA) system 100 is implemented in an on-demand service that enables one or more LVs to receive a request and to compute independently based on a price metric provided by an ODA server or using a utility function in response to the request to confirm an acceptance to the request and create a virtual link with a follower vehicle (Fv) to control the Fv by communication links, and control systems of the vehicle 10.

As depicted in FIG. 1, vehicle 10 generally includes a chassis 12, a body 14, front wheels 16, and rear wheels 18. Body 14 is arranged on chassis 12 and substantially encloses components of vehicle 10. Body 14 and chassis 12 may jointly form a frame. The wheels 16-18 are each rotationally coupled to the chassis 12 near a respective corner of the body 14.

In various embodiments, vehicle 10 is an autonomous vehicle, and the ODA system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, package delivery vehicles, etc., can also be used.

In an exemplary embodiment, the autonomous vehicle 10 is a so-called Level Two, Two plus, Three, Four, or Level Five automation system. A level Two or Two plus system indicates a system that has capabilities to create and confirm a virtual link and enable an Lv to control the Fv to a requested location where the Fv has relinquished control of vehicle operation to the Lv.

A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously variable transmission, or other appropriate transmissions. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences the position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
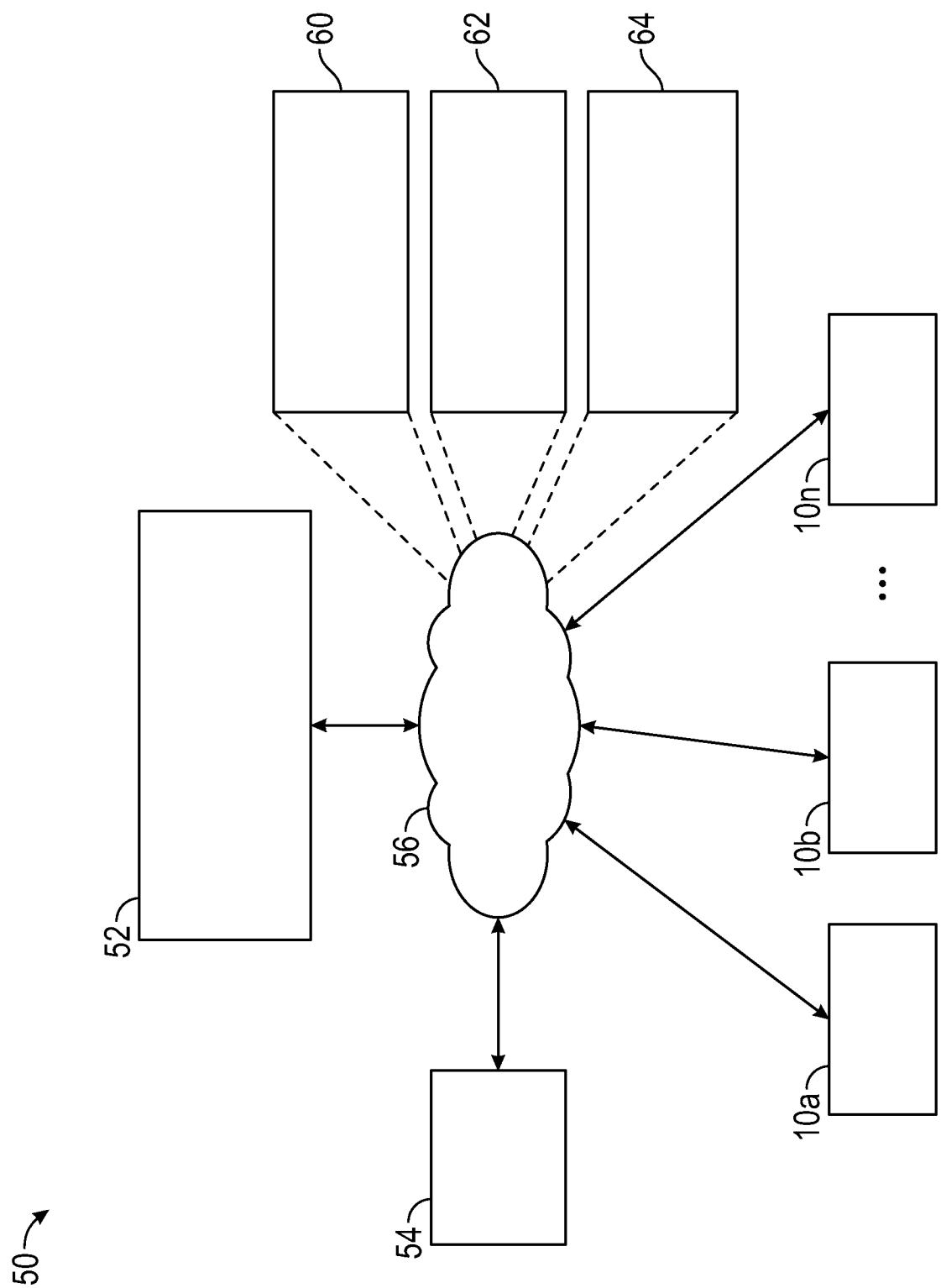
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer-readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the ODA system 100 and, when executed by the processor 44, including the processing of requests including receiving and accepting requests from a remote cloud ODA server, processing instructions, various decision-making responses, monitoring for broadcast messages associated with the virtually made vehicle leader and follower configurations, and providing status information for an ODA service.

With reference now to FIG. 2, in various embodiments, the autonomous vehicle 10 described with regard to FIG. 1 may be suitable for use in the context of a taxi or shuttle system in a certain geographical area (e.g., a city, a school, or business campus, a shopping center, an amusement park, an event center, or the like) or may simply be managed by a remote system. For example, the autonomous vehicle 10 may be associated with an autonomous vehicle-based remote transportation system.

FIG. 2 illustrates an exemplary embodiment of an operating environment shown generally at 50 that includes an autonomous vehicle-based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices (i.e., Lv, Fv, and ODA server), systems, and components supported by the operating environment 50 (e.g., via tangible communication links and/or wireless communication links). For example, the communication network 56 can include a wireless carrier system 60 such as Vehicle-to-Vehicle (V2V), Vehicle-to-Everything (V2X), a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including, for example, digital technologies such as CDMA (e.g., CDMA2000), LTE (e.g., 4G LTE or 5G LTE), GSM/GPRS, or other current or emerging wireless technologies. Other cell towers/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone networks (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62 but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smartwatch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle-based remote transportation system 52. To this end, an autonomous vehicle and autonomous vehicle-based remote transportation system can be modified, enhanced, or otherwise supplemented to provide the additional features described in more detail below.

Figure 3:
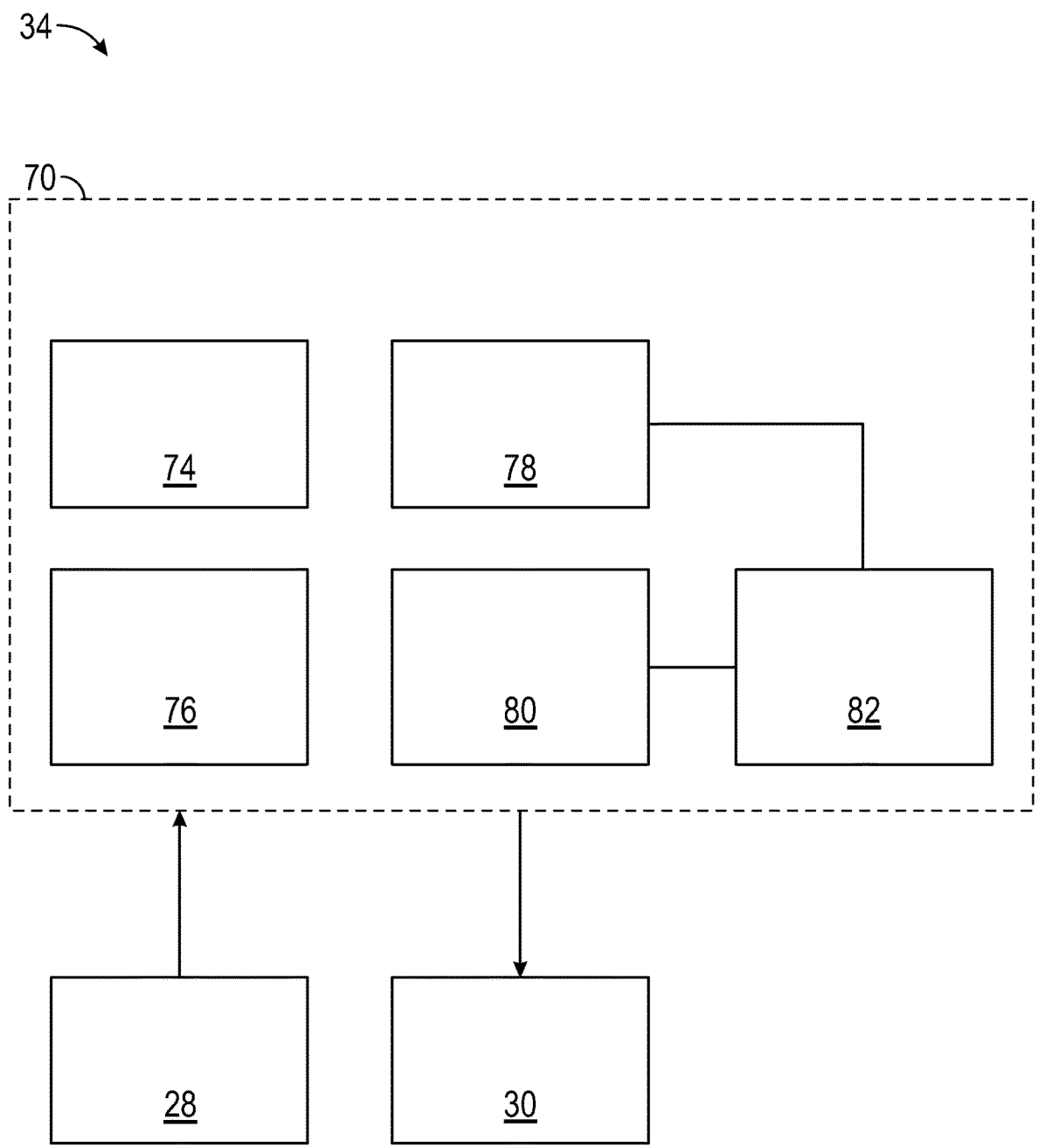
FIG. 3 is a dataflow diagram illustrating an autonomous driving system that includes an On-demand Autonomy system of the autonomous vehicle, in accordance with various embodiments.

In accordance with various embodiments, controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to the lane of a road, vehicle heading, velocity, etc.) of the vehicle 10 relative to the environment. The guidance system 78 processes sensor data along with other data to determine a path for vehicle 10 to follow. For example, a path to a pick-up or drop-off location for the ODA service. The vehicle control system 80 generates control signals for controlling the vehicle 10 according to the determined path.

In various embodiments, controller 34 implements machine learning techniques to assist the functionality of controller 34, such as feature detection/classification, obstruction mitigation, route traversal, mapping, sensor integration, ground-truth determination, and the like.

As mentioned briefly above, the ODA system 100 of FIG. 1 is included within the ADS 70, for example, as the ODA system 82 that provides communication requests, for example in one embodiment of Host vehicle configured for vehicle 10 to receive requests broadcast from an on-demand autonomy server configured with the autonomous vehicle based remote transportation system 52. Also, in another embodiment of Robot Taxi (leader vehicle Lv) configured for vehicle 10 to accepts broadcast from an on-demand autonomy server configured with the autonomous vehicle based remote transportation system 52.

Figure 4:
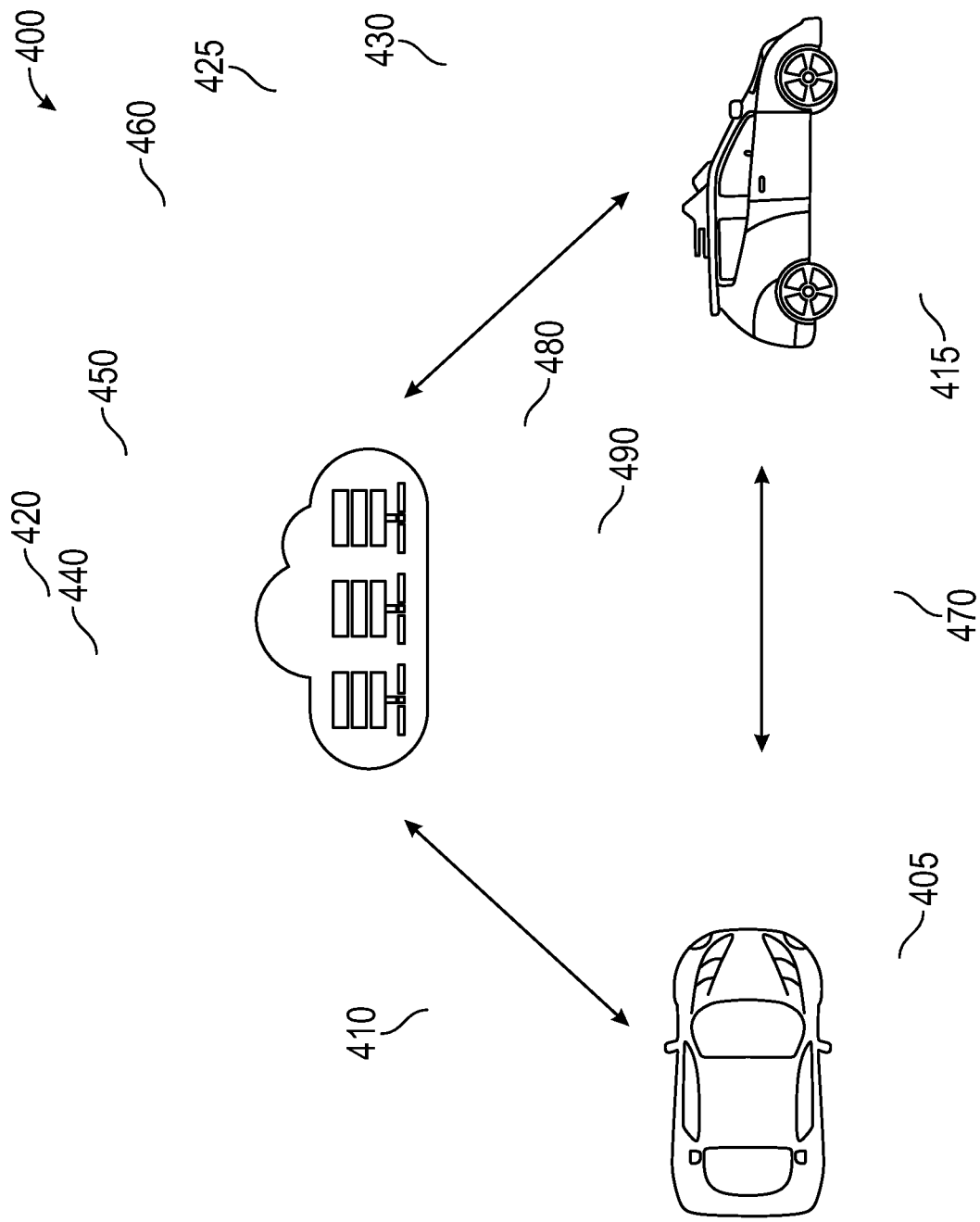
FIG. 4 is a diagram of modules and other entities and the data flow therebetween of ODA system of the autonomous vehicle, in accordance with various embodiments.

For example, as shown in more detail with regard to FIG. 4 and with continued reference to FIG. 3, the ODA system 82 includes functionality in response to the request from an on-demand server to provide information about the vehicle 10 current status and a variety of different parameters, e.g. current location, distance, time to a location, type of vehicle, availability, ability to initiate virtual coupling, etc. for the ODA service to make the appropriate leader vehicle LV and follower vehicle FV selections. The ODA system 82 includes capabilities to confirm the acceptance to request from the ODA server and to create a virtual link between the Lv and Fv. The ODA system 82 includes processing capabilities to independently make decisions based on price metrics and a set of weighting factors in an intelligent model as to whether to accept a request from an ODA server that has been broadcast to a number of Lvs, where the ODA server is coordinating the acceptances of multiple Lvs, and Fvs for requested location assistance and control of Fvs. The ODA system 82 includes processing capabilities to weigh multiple factors and to link and unlink an Lv in a multi-stage segmented route requested by the ODA server in response to assistance solicited for route control and navigation by an Fv. The ODA system 82 has the processing ability to participate in a vehicle platoon configured in response to responses solicited by the ODA server, where the Lv is replaced one or more times on a multi-segmented route to the requested destination as configured by the ODA server.

The ODA system 82 may include a neural network engine that has been trained for the objects of interest to vehicles, in one embodiment, that includes trained data, trained processes in the form of computer program instructions, and a processor for executing those instructions. Such objects of interest that form part of the training of the neural network engine include locations of interest, prior virtual couplings of an Fv and Lv, prior pickups, prior information about drop-off locations that the vehicle has performed, and cost metrics and route pricing information, etc. . . . . .

The exemplary embodiment of the ODA system 100 of FIG. 1 is included in the autonomous driving system 70. The autonomous driving system 70 is configured to execute steering and speed control maneuvers, amongst other possible autonomous driving possibilities, to avoid collisions and to move cooperatively with tracked objects based in part on the control commands. The autonomous driving system 70 operates known autonomous vehicle control computer instructions through a processor-based in part on the control data, as described above with respect to FIG. 3

FIG. 4 shows a communication network of the on-demand autonomy service 400 between the various leader and follower vehicles in communication with cloud OAD server to configure virtual couplings between the various leader and follower vehicles in accordance with an embodiment.

In various exemplary embodiments, the on-demand autonomy (ODA) service 400 can configure a platoon to consist of one leader vehicle (Lv) configured to guide one or more follower vehicles (FVs) from one point to another in the ODA service.

In various exemplary embodiments, the on-demand autonomy (ODA) service 400 can configure a platoon to consist of multiple leader vehicles (Lvs) configure amongst multiple segments of a route from with one or more follower vehicles (Fvs) about each route segment that makes up the route from one point to another point in the on-demand service.

In various exemplary embodiments, the on-demand autonomy (ODA) service 400 can put forth a pricing model for a configured vehicle platoon that is made up of multiple route segments where each route segment can include differently created virtual links between different Lvs and an Fv.

In exemplary embodiments, the ODA server (ODAS) 425 can be configured to enable multiple Lvs to accept requests coordinated by the ODA server with the Fv to create multiple virtual links between multiple sets of Lvs and Fvs to make up the route from one point to another in the on-demand service.

In FIG. 4, the ODA system 100 includes functionality to communicate with the on-demand autonomy (ODA) service 400 between a host (e.g., service requestor or Fv) 405, an on-demand autonomy server 425, and Robo taxi (e.g., leader or Lv) 415. The ODA service 400 includes the functionality of receiving requests 410 that are transmitted between the on-demand autonomy server (ODAS) 425 and the host 405, and accepted responses 430 that are transmitted between the on-demand autonomy server 425 and the Robo taxi 415 to initiate a trip (or virtual coupling between the Lv and Fv) 470.

The ODA server 425 performs ODA service 400 functionalities to initiate the trip 470 and cause the virtual coupling between the Lv and Fv by initially broadcasting a request 420 for acceptance by a Robo taxi 415 whereupon the broadcast request 420 is accepted by an affirmation or an accept response 430 by a Robo taxi 415 or in an exemplary embodiment, by multiple Robo taxis (not shown).

In an exemplary embodiment, the ODAS 425 may automatically put forth a notification to a driver or an Fv to initiate a request 420 for a trip 470 based on input data from the Fv including poor driving, difficult driving conditions based on weather reports, etc. In an exemplary embodiment, the ODAS 425 may promote various pricing for the Fv to initiate the request 420 to create a virtual link with the Lv.

The ODA server 425 using a decision-making intelligent algorithm elects a leader 440 which consists of one or more Robo Taxi(s) 415. In other words, based on multiple inputs that include the current state of the vehicle, route of the vehicle, weather, passenger preference, follower pick-up/drop-off locations, and past history, etc. the elected leader or leaders 440 are both identified and selected. The ODA server 425 identifies a rendezvous 450 and communicates trip details 460 to the host and leader to execute an on-demand action.

In an exemplary embodiment, the Fv may request assistance to a location without actually having to perform driver operation. For example, the Fv may be configured with Level 2 plus capabilities that provide limited autonomous vehicle operations yet have communication capabilities to make requests for an on-demand service, enable a virtual link with the Lv where the Lv can be given sufficient operational control to virtual link and virtually tow the Fv to the desired location without the driver of the Fv actually having to operate the Fv.

In an exemplary embodiment, the ODA service 400 can transport the Fv in a platoon configuration with the Lv for enabling an autonomous driving experience (i.e., a level 4 or 5 autonomous driving experience) without the Fv actually being configured or having level 4 or 5 autonomous driving capabilities. That is, by creating a virtual link between the Lv and Fv, the Fv can operate in a semi or nearly autonomous manner by reliance on the control operations provided by the Lv. In an embodiment, by relying on the Lv for control and navigation to the requested location, the Fv can simulate an autonomous driving experience without actually being configured with the necessary software, hardware, and control system for level 4 or 5 autonomous driving capabilities.

In an exemplary embodiment, the driver of the Fv may desire a more autonomous driving experience and is willing to relinquish vehicle control for a route segment or entire route to the Lv. In this case, the follower vehicle (Fv) may send a request 420 to an ODAS 425, the ODAS 425 would coordinate pricing and selection of an Lv using a distributed protocol to solicit requests from multiple Lvs, and to enable a virtual link between the Fv and Lv, to perform a virtual towing operation to the desired location chosen by the Fv.

In various embodiment, multiple Lvs may be coordinated by the ODAS 425 to assist the Fv where the Fv is coupled by consecutive virtual links to multiple different Lvs selected in a coordinated process (i.e., distributed protocol solicitation of requests by the ODAS 425) from a group of Lvs identified by the ODAS 425, and who independently make a decision to accept a request based on a value score for the route or route segments and can enable a virtual link with the Fv in the vehicle platoon configuration as put together by the ODAS 425.

In the various exemplary embodiment, the Fv in the linking operation creating the virtual link with the Lv is given the option to accept the linking request with a value score (or price metric) for the assistance provided by one or more Lvs. In this case, the ODAS 425 coordinates a set of responses from the Fv and one or more Lvs to complete or confirm a solicitation for a virtual link to control the Fv to the requested location based on a proposed price (i.e., value score/cost metric). The proposed price maybe for the entire route, or a route segment where the decision to complete or confirm the transaction (i.e., the handshake between both parties) is coordinated by the ODAS 425.

In an exemplary embodiment, the cost metric or price charge by the Lv may be computed by the Lv independently or by the ODAS 425. The price charge, as an example, can be determined using a weighting factor for parameters of a set of parameters based on empirical testing and past history of Fv and Lv operations in the ODS service. The weighting factors may allow for modeling of more accurate value scores, and for adjusting the value score to take into account revenue decreases and ride diffraction that can be applied if the Fv elects not to confirm the acceptance to the request from the ODAS 425.

In an exemplary embodiment, the ODAS 425 may put constraints such as time to accept, demand pricing to accept, or other real-time constraints to the proposed price for the assistance to be provided by the Lv to enable timely completion of the request and formation of virtual link between the Lv and Fv. In another embodiment, the Lv or a set of Lvs may respond to a request broadcasted (i.e., a broadcast of information) by the ODAS 425 based on a value score that the ODAS 425 computes based on a set of weighted factors for the route and for assisting the Fv in the virtual tow operation to a destination requested. The Lv may be given a window of time to respond to the request and to agree to the value score (i.e., price proposed to assist) for the route, route segment, multiple route segments, etc. . . . as presented by the ODAS 425, and likewise, the Fv would be given a similar type time constraint to make a decision. Once, the handshake or agreement is made by the coordinated process via the distributed protocol implemented by an algorithm of the ODAS 425 the platoon is configured by the created virtual links to assist the Fv for the route request.

In various exemplary embodiments, the Lv may have a set of preferences, and a set of capabilities that can be provided to the ODAS 425 that can change the value score, or make the Lv, a more optimal choice to engage with the follower vehicle Fv for the route assistance and provide the virtual towing operation via the virtual link. In an exemplary embodiment, the Lv can be an advanced fully automated vehicle with Level 4 or Level 5 capabilities that can respond to the ODAS 425 in an automated manner. For example, the Lvs maybe a fleet of pre-designated Robo-taxis with pre-configured capabilities to virtual link with Fvs to enable Fv with semi-autonomous or only communication capabilities for Lv autonomous control to traverse a route via a configured vehicle platoon by the ODAS 425 in an autonomous driving way.

Figure 5:
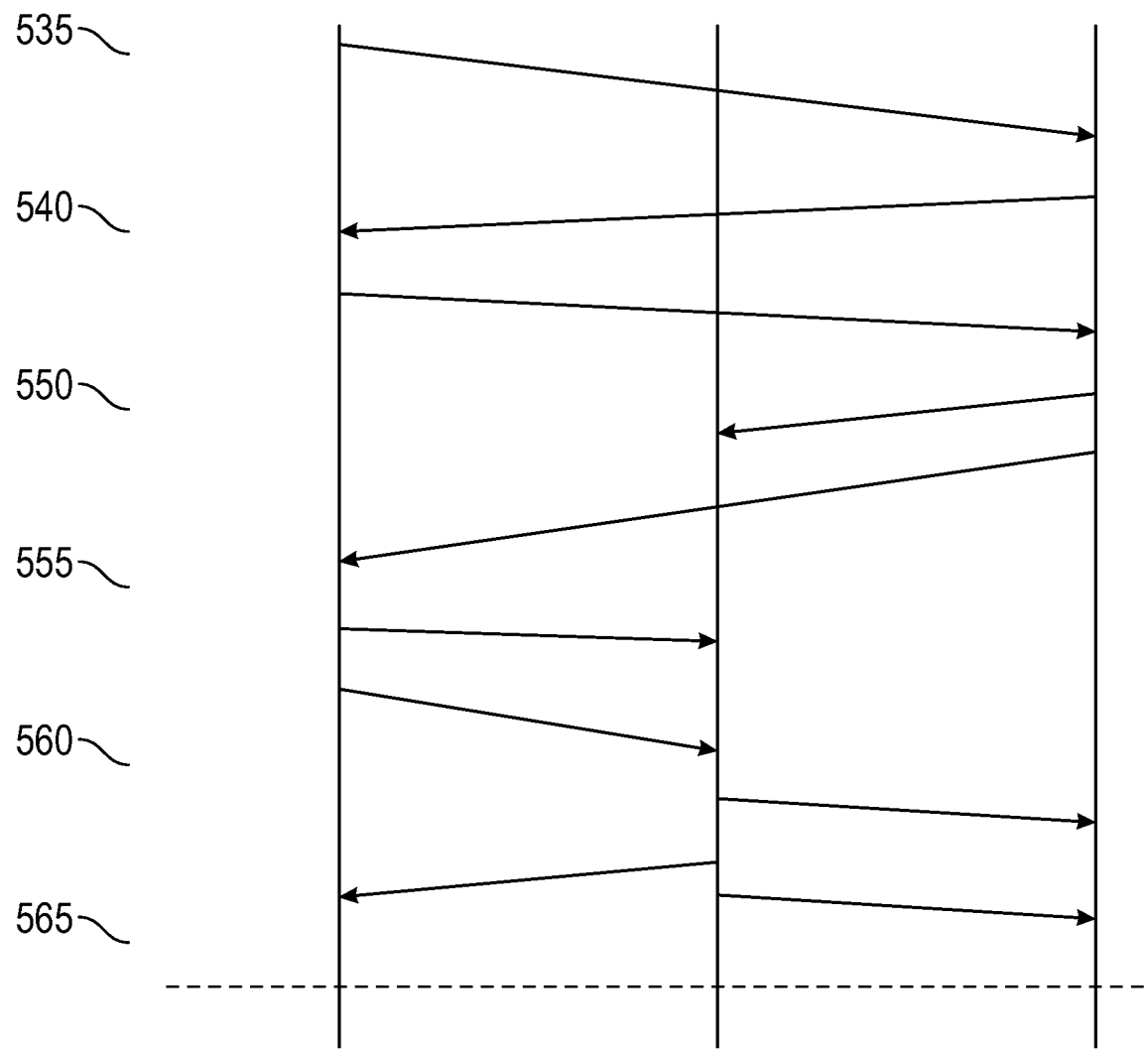
FIG. 5 is a sequence diagram of requests of modules and other entities and the data flow therebetween of the ODA system of the semi-autonomous and autonomous vehicle, in accordance with various embodiments.

FIG. 5 is an exemplary diagram of a timing chart of the interaction of the ODA server, the host vehicle or Fv, and the Robo Taxi or Lv of the ODA service in accordance with various embodiments. In FIG. 5, in an embodiment, at an initial time 535 (Time T1), the Fv 510 requests to use the ODA service for a location that is transmitted to the ODA server 530. The ODA server 530 responds to the request received by using a distributed protocol to coordinate a set of solicitations for response amongst a group of Lvs and send Lv information to the Fv 510 at a time 540 (Time T2). In response, and with confirmation of the leader selection information at a time 550 (Time T3), the ODA server 530 then or nearly simultaneously sends a confirmation of acceptance to the Fv 510 at a time 555 (Time 4). Also, at time 555, the platoon request is sent to the Lv 520 to configure the vehicle platoon via the virtual link. At time 555 (Time T5), the platoon link is received by the Lv 520 and the ODA service is confirmed, and periodic updates are also sent. Finally, at time 565 (Time T6), upon the Fv 510 reaching the destination, the virtual link is unlinked between the Lv 520 and Fv 510, and the service completion information is transmitted to the ODA server 530.

Figure 6:
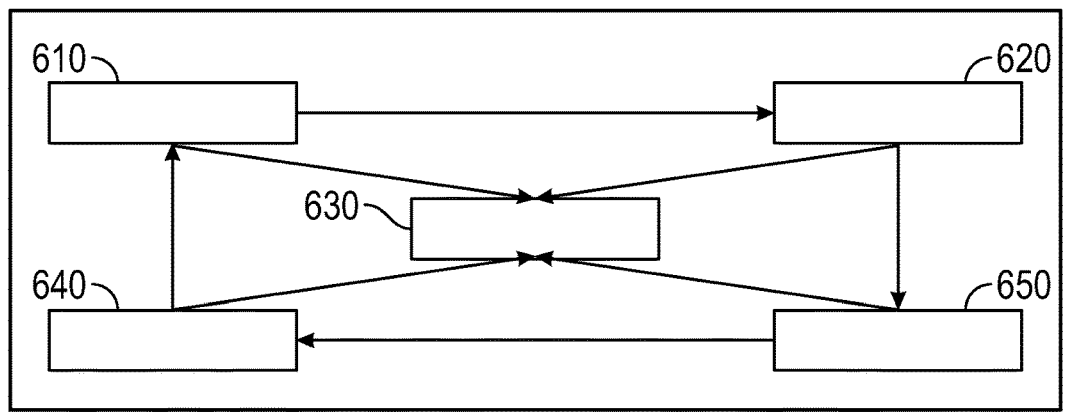
FIG. 6 is a diagram of modules and other entities and the data flow therebetween of ODA system of the autonomous vehicle, in accordance with various embodiments.

FIG. 6 shows a high-level diagram of the set of functional modules communicating with each other to achieve the functionality of the leader vehicle of the ODA system in accordance with various embodiments. The steps of the flow chart of FIG. 6 can be implemented by computer program instructions stored on a computer-readable medium executed by a processor such as at least one processor 44 (of FIG. 1). The steps may be carried out by the modules and sub-modules described in FIG. 6 for example and may also take in further aspects of the ODA system 82 described with respect to FIG. 3.

FIG. 6 includes five basic modules of the ODA system 600 of an Fv Selection module 610, a pickup module 620, an indication module 630, a drop off module 640, and a towing module 650. The Fv Selection module 610 receives information from the drop-off module 640 and transmits information to the indication module 630 and the pickup module 620. The Fv Selection module 610 processes information that includes the vehicle state, the passenger preference, the current route, the weather condition to an algorithm to make a selection of a leader vehicle (Lv) from a set of available leader vehicles that have responded to accept the broadcast request for the ODA server. The other modules of the pickup module 620, the indication module 630, the drop off module 640, and the towing module 650 perform that perform appropriate maneuvers using the underlying drive automation modules (DAS) modules (e.g., for example, described in FIGS. 1-3) and low-level controllers including more basic platoon service controllers. The messages are exchanged between the ODA server and the five modules during an on-demand service operation.

Figure 7:
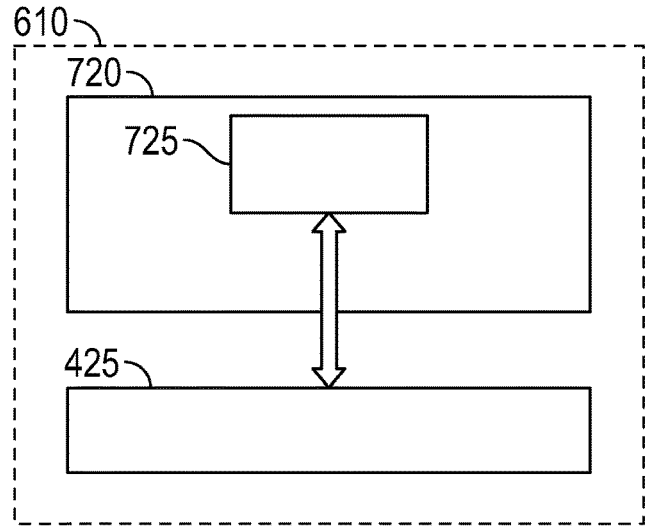
FIG. 7 is a diagram of modules and other entities and the data flow therebetween of ODA system of the autonomous vehicle, in accordance with various embodiments.

FIG. 7 is a diagram of a follower vehicle selection module (i.e., Fv selection module 610) of the ODA system in accordance with various embodiments. In FIG. 7, the Fv selection module 610 includes components of the leader to complete the virtual coupling of the Fv with the Lv. The Fv selection module 610 is configured in a constant monitoring state (i.e., similar to a watchdog monitoring type system) when the Lv controller 720 is operating or placed in an executing mode, and assists in decision making in the selection or deselection of one or more of the follower vehicles (Fv). The selection algorithm or decision-making steps to schedule selections 725 are executed based on coordination between the availability status determined of a selected leader vehicle (Lv) and one or more potential follower vehicles (Fvs). In this instance, the leader vehicle (Lv) is configured to only communicate with the ODA server to make the selection and the virtual coupling between the Fv and the Lv. That is the decision-making is unidirectional based on one-sided input from the leader vehicle (Lv) only without interference from the Fv. In other words, the follower vehicle (Fv) is subordinated in the decision-making selection role and is selected based on input from the leader vehicle (Lv) only to make the resultant selection. The ODA server 425 based on the Lv communications, executes a distributed protocol that includes multiple follower vehicles and other leader vehicles in the communication net that are coordinated to make the selection. The ODA server (ODAS) 425 provides one or more follower vehicle (Fv) selection based on various parameters that include metrics such as location and availability present or future. The Lv makes a cost-benefit analysis using an intelligent algorithm that weighs multiple criteria that may include the location of the pickup, time to the pickup, the length of the trip, the passenger criteria, etc. of the options presented by the ODA server 425 of the options presented to decide whether to accept the request.

Figure 8:
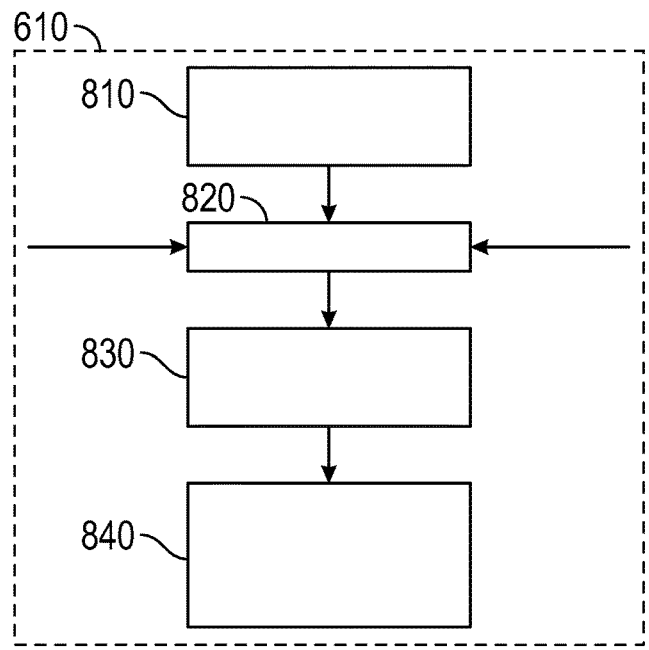
FIG. 8 is a diagram of modules and other entities and the data flow therebetween of ODA system of the autonomous vehicle, in accordance with various embodiments.

FIG. 8 is another diagram of a functional flow of the allocation steps for a selection of the follower vehicle selection module (i.e., Fv selection module 610) of the ODA system in accordance with various embodiments.

In FIG. 8, the Fv selection module 610 includes the functional modules of module 810 configured to receive data from the ODA server 425, and the compute utility module 820 configured to receive multiple inputs for processing as follows: (1) input of follower vehicle Fv data from the ODA server 425, (2) input of the leader vehicle Lv state, and (3) input of the passenger preference. The compute utility module 820 performs computation for every selection of Fv. The utility function relies on the multiple inputs of vehicle state information and passenger preference and can include information of the current state of the vehicle, the route of the vehicle, the weather, the passenger present, the follower pickup/drop off locations, history to determine a utility value or an optimal or maximum utility value. The utility value generated by the compute utility module 820 is sent to the Fv list at functional block 830 that has been put together at the ODA server 425, and based on the Fv list, at functional block 840, a list of a receive Fv allocation from the ODA server 425 is generated.

The compute utility (function) module 820 implements a smart (intelligent) algorithm to determine a return on investment or cost analysis for picking up or continuing with a certain follower vehicle (Fv) for the virtual coupling to the on-demand service. That is, the investment for picking up or the continuing of the selection of the Fv is not a static quantity but a dynamic investment that is constantly changing based on model quantities.

In an exemplary embodiment, the follower vehicle (Fv) has multiple inherent overheads that must be weighed iteratively to make an optimum investment analysis in a certain window of time or opportunity. For example, the increase in trip time (t), maneuver complexity (c), passenger discomfort (d), and also the likelihood in the near future of a better investment return based on history. The inherent overhead costs or factors are weighed against an increase in revenue (r), the use (or non-use to generate revenue) of the vehicle (u).

The utility value (function) model is configured with multiple factors, each of which is normalized in real values to generate a utility value score. The utility value functional model is as follows: $U_s = (w_1 \times t) + (w_2 \times c) + (w_3 \times d) + (w_4 \times r) + (w_5 \times u)$ where $w_i$ are appropriate weights. The weights are configured to depend on weather conditions, traffic, time of day, etc. . . . . The values of t, c, d, and r are dependent upon the chose Fv. The goal of the utility model is to maximize the value of $U_s$ among all the Fvs available. The utility value is based upon short-term gains and losses. There can also be long-term benefits and losses in accepting and rejecting follower vehicle requests e.g., customer dissatisfaction, revenue decrease, loss of future business, etc. . . . .

Figure 9:
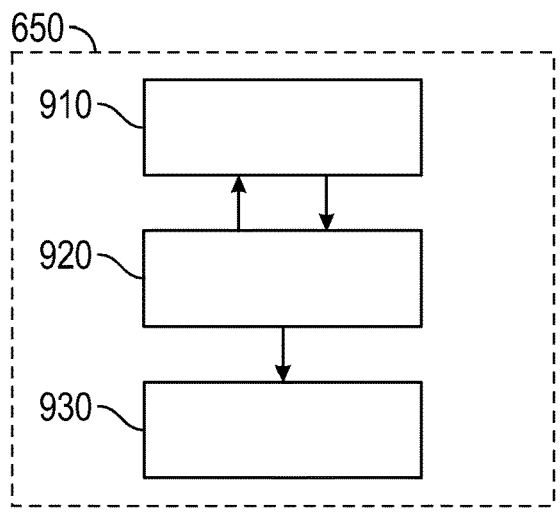
FIG. 9 is a diagram of modules and other entities and the data flow therebetween of ODA system of the autonomous vehicle, in accordance with various embodiments.

FIG. 9 illustrates a diagram of the towing module of the ODA system in accordance with various embodiments. In FIG. 9, the towing module 650 includes an initiate platooning functional block 910, a live status update to ODAS functional block 920, and the terminate platooning functional block 930. The towing module 650 uses the service of platooning implemented on Lv. The towing module 650 includes the operations of initiating the platooning service via the platooning functional block 910 upon picking up or selecting the Fv. The towing module 650 monitors and provides status updates to the ODA server 425 via the live status update to ODAS functional block 920. Any failure in platooning results in re-initiating service. The platooning service is terminated, via the terminate platooning functional block 930, by either reaching the destination or by multiple failures to execute a platooning feature or platooning operation.

Figure 10:
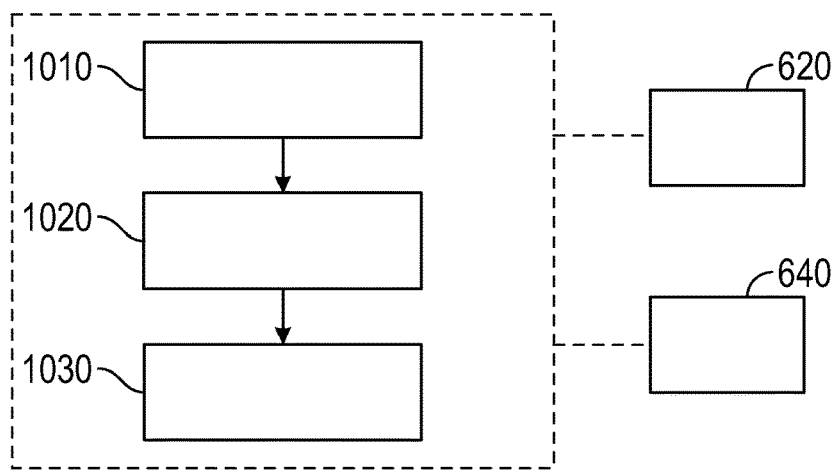
FIG. 10 is a diagram of modules and other entities and the data flow therebetween of ODA system of the autonomous vehicle, in accordance with various embodiments.

FIG. 10 illustrates a diagram of the pickup module 620 and drop off module 640 of the ODA system in accordance with various embodiments. In FIG. 9, the pickup module 630, and the drop off module 640 are configured each into three submodules that include an Fv/empty space locator function 1010, a position maneuvers function 1020, and a linking/delinking module 1030 to cause the functions in the pickup and drop off the Lv and Fv by the ODA system.

Figure 11:
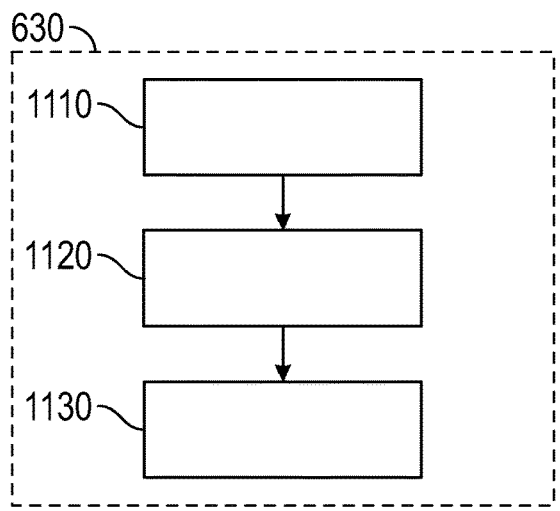
FIG. 11 is a diagram of modules and other entities and the data flow therebetween of ODA system of the autonomous vehicle, in accordance with various embodiments.

FIG. 11 illustrates a diagram of the indication module 630 of the ODA system in accordance with various embodiments. The indication module 630 includes the functional blocks of the initialization function 1110, the Lv state monitoring function 1120, and the trigger indication function 1130. The indication module 630 is responsible for the Fv to position itself appropriately for linking and delinking, and for enabling other traffic participants to be excluded and kept away (i.e., not within a selection or location to cause interference when possible). The Lv is configured with lights and other indicator mechanisms (i.e., projected type mechanisms) that can be enabled in various states (as monitored by the Lv state monitoring function 1120) including an ON and OFF state. Also, a quasi ON/OFF prior to being in the ON/OFF states, and to provide notice of executions or processes from other modules. For example, certain lighting arrangements can be configured to correspond to various Lv states in operation. The trigger indication function 1130 enables the triggering or sequencing of lighting of the Lv or Fv in patterns based on the Lv or Fv status. For example, in an embodiment, the light pattern is indicative of a vehicle 10 as the Lv, and in another embodiment, the light pattern is indicative of vehicle 10 as the Fv in accordance with a sequence or pattern configured by the trigger indication function 1130.

Figure 12:
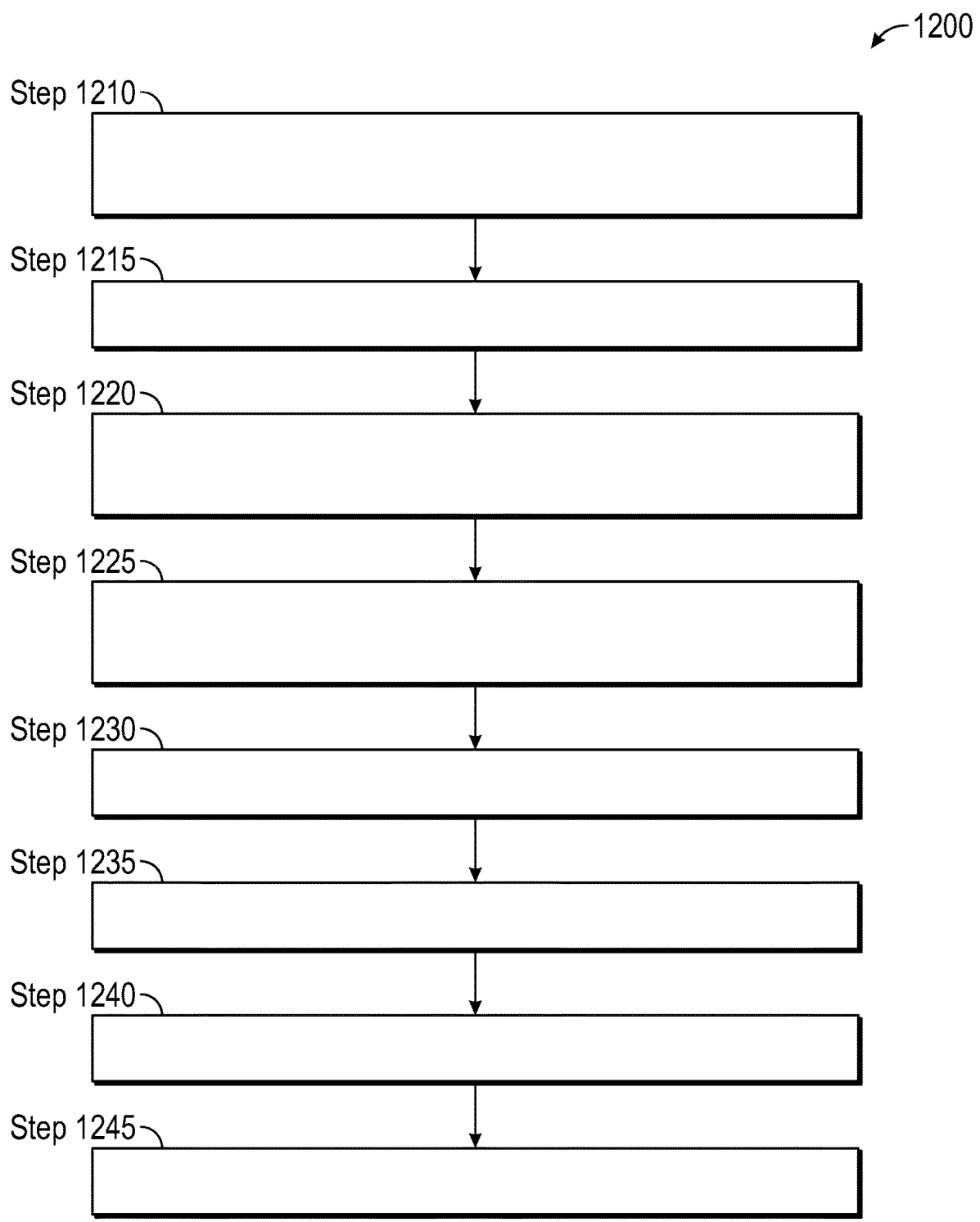
FIG. 12 is a flowchart illustrating a control method for controlling the autonomous vehicle based on the ODA system, in accordance with various embodiments.

FIG. 12 is a flowchart of the functional processes by the ODA server in operation in conjunction with the Lv and Fv of the ODA system in accordance with various embodiments.

In flowchart 1200, at step 1210, the Fv sends a request for the on-demand autonomy service. At step 1215, in response, the ODA server initiates a trip request to cause the virtual coupling between the Lv and Fv. In exemplary embodiments, the Fv is at least categorized as a level two vehicle with at least the capability to communicate with the ODA server, to create the virtual link with the Lv, and to relinquish navigation and control to the Lv in the vehicle platoon. The Lv is at least categorized as the level two vehicle with at least capability to communicate with the ODA server, to create the virtual link with Fv, and to perform the operation of navigating and the control of the Fv to the requested location in the vehicle platoon.

At step 1220, the ODA server information broadcasts information for the trip request via the distribution protocol to solicit multiple responses from the set of Lvs to create the virtual link between the Lv and Fv. In an exemplary embodiment, the information broadcast from the ODA server can be configured for a multi-segment route with multiple Lvs for the control and navigation of the Fv to the requested location. In this instance, a set of solicited responses associated with one or more route segments with the cost metric for each Lv to confirm the acceptance of the ODA service request per segment. In an exemplary embodiment, for the multi-segment route, the vehicle platoon is configured with more than one Lv with the Lvs of the vehicle platoon changed intermittently in accordance with the one or route segments to the requested location.

At step 1225, the Lv receives information from the ODA server and determines a value score with a cost metric of an amount provided for the Lv to navigate and control the Fv to the requested location. In an exemplary embodiment, the value score is based on a cost-benefit using a plurality of weighted factors to determine a cost charge for the Lv to perform the navigation and the control of the Fv to the requested location. In an embodiment, a utility function is specified and executed by the ODA server and cost values are sent to Lv and Fv for approval/rejection. Each entity, the Lv, the Fv, and the ODA server makes an independent decision, and a decision is reached between all 3 entities or a "meeting of the minds" that is coordinated by the ODA server. For example, a selection module of the Lv is configured with an intelligent module for independently calculating and determining a value score from the Lv perspective whether to confirm the requests. In other words, the Lv, Fv, and the ODA server each are configured to determine an individual value score that is best suited for each other and may/may not be the same value score across all three entities. In an embodiment, the selection module of the Lv or Fv configured determines a value score which is personal or in either entities perspective (the Lv or Fv) based on the broadcast information received from the ODA server that includes a cost metric of an amount provided by the ODA service for the Lv to perform the control of the Fv to the requested location or for the Fv to request the ODA service from the Lv. The value score is an independently calculated score of value based on factors associated directly with the Lv or Fv operation for the ODA service request from each entities perspective, that can include as an example, the current location, time to travel to the pick up location, opportunity costs to wait for another ODA request, etc. for one or both of the entities.

At step 1230, based on the information received, the Lv decides whether to confirm the ODA service request and to create the virtual link with the Fv. In an exemplary embodiment, In the various exemplary embodiment, the Fv for the linking operation in creating the virtual link with the Lv, the Lv is given the option to accept the linking request with a value score (or price metric). At step 1235, the ODA server coordinates the confirmation of acceptance of one or more Lv to create virtual links with the Fv and form the vehicle platoon. The proposed price may be for the entire route, or a route segment where the decision to complete or confirm the transaction (i.e., the handshake between both parties) is coordinated by the OD server.

At step 1240, once the link has been confirmed, the Lv has accepted, the vehicle platoon is configured and the virtual tow of the Fv is commenced for the route. The Fv relinquishes control to the Lv for the route. At 1245, if the Lv does not confirm the acceptance of the virtual link, then the Lv continues to monitor the information broadcast from the ODA server for another ODA service request, in an iterative manner until the Lv makes a decision of accepting and confirm another request from the ODA server.

It should be appreciated that the process of FIG. 12 may include any number of additional or alternative tasks, the tasks are shown in FIG. 12 need not be performed in the illustrated order, and the process of FIG. 12 may be incorporated into a more comprehensive procedure or process having additional functionality not described in detail herein. Moreover, one or more of the tasks shown in FIG. 12 may be omitted from an embodiment of the process shown in FIG. 12 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It is understood that various changes may be made in the function and arrangement of elements described in an exemplary aspect without departing from the scope of the invention as set forth in the appended claims.

What is claimed is:

1. An On-Demand Autonomy (ODA) system, comprising:
    a selection module, disposed in a leader vehicle (Lv) in communication with an ODA server, configured to, by a processor, determine whether to confirm a request for an on-demand autonomy (ODA) service which has been broadcast by the ODA server to a set of Lvs, wherein the ODA service request comprises control of a follower vehicle (Fv) to a requested location by creating a virtual link between the Lv and the Fv to configure a vehicle platoon to enable transport of the Fv by the Lv, wherein the vehicle platoon is a linking of the Lv to the Fv via the virtual link to enable the Lv to assume the control of the Fv to the requested location;
    the selection module configured to, by the processor, process information broadcast from the ODA server wherein the information broadcast occurs via a distribution protocol to solicit multiple responses from the set of Lvs for creating the virtual link between the Lv and the Fv, wherein each Lv of the set of Lvs independently decides whether to confirm the ODA service request and to create the virtual link with the Fv;
    the selection module configured to, by the processor, determine a value score which independently by the Lv from broadcast information that includes a cost metric of an amount provided by the ODA service for the Lv to perform the control of the Fv to the requested location wherein the value score is based on a set of factors directly associated with operation of the Lv to the ODA service request, wherein the selection module determines the value score based on an intelligent model that includes a set of weighted factors that comprise overhead operating costs, maneuver complexity requirements for executing the on-demand service request, comfort level of a passenger in accordance with passenger preference, and operation time projected to occur, and a likelihood of a better investment return compared to a past investment return, wherein the selection module determines values of the set of weighted factors based on empirical testing and past history; and
    in response to a receipt of the value score, the selection module is configured to, by the processor, decide whether in a first instance, confirm acceptance of the ODA service request and enable the virtual link to control the Lv in the vehicle platoon to the requested location, and in a second instance, not confirm the acceptance and continue to monitor the information broadcast from the ODA server to wait for another ODA service request.

2. The system of claim 1, wherein the value score is based on a cost-benefit using the set of weighted factors to determine the cost metric for the Lv to control of the Fv to the requested location.

3. The system of claim 2, further comprising:
    the selection module configured to, by the processor, receive the information broadcast from the ODA server that is divided up into one or more route segments for the control of the Fv to the requested location and comprises a set of solicited responses associated with the one or more route segments with the cost metric for each Lv to confirm the acceptance of the ODA service request per segment.

4. The system of claim 3, wherein the vehicle platoon is configured with more than one Lv when the set of solicited responses is associated with the one or more route segments to the requested location with the Lvs of the vehicle platoon changed intermittently in accordance with the one or route segments to the requested location.

5. The system of claim 4, wherein the Fv is at least categorized as a level two vehicle with at least capability to communicate with the ODA server, to create the virtual link with the Lv, and to relinquish navigate and the control to the Lv in the vehicle platoon.

6. The system of claim 5, wherein the Lv is at least categorized as the level two vehicle with at least capability to communicate with the ODA server, to create the virtual link with the Fv, and to perform the control of the Fv to the requested location in the vehicle platoon.

7. The system of claim 6, wherein the virtual link between the Fv and the Lv enables the Fv to simulate a higher level of autonomous driving capability in the vehicle platoon to the requested location by reliance on the Lv for the control without the Fv having been actually configured with the higher level of autonomous driving capability.

8. A method for an On-Demand Autonomy (ODA) service, comprising:
configuring a selection module, disposed in a leader vehicle (Lv) in communication with an ODA server;
determining, by the selection module, whether to confirm a request for the ODA service which has been broadcast by the ODA server to a set of Lvs wherein the ODA service request comprises navigation and control of the Fv to a requested location by creating a virtual link between the Lv and the Fv for configuring a vehicle platoon for enabling transport of the Fv by the Lv wherein the vehicle platoon is a linking of the Lv to the Fv via the virtual link to enable the Lv to assume control of the Fv, and to navigate the Fv to the requested location;
processing, by the selection module, information broadcast from the ODA server wherein the information broadcast occurs via a distribution protocol to solicit multiple responses from the set of Lvs for creating the virtual link between the Lv and Fv wherein each Lv of the set of Lvs independently decides whether to confirm the ODA service request and to create the virtual link with the Fv;
determining, by the selection module, a value score independently by the Lv based on the information broadcast that provides a cost metric of an amount provided by the ODA service for the Lv to navigate and the control of the Fv to the requested location wherein the value score is based on a set of factors directly associated with operation of the Lv to the ODA service request, wherein the determining the value score is based on an intelligent model that includes a set of weighted factors that comprise overhead operating costs, maneuver complexity requirements for executing the on-demand service request, comfort level of a passenger in accordance with passenger preference, and operation time projected to occur, and a likelihood of a better investment return compared to a past investment return, wherein the selection module determines values of the set of weighted factors based on empirical testing and past history; and
deciding by the selection module whether in a first instance, for confirming acceptance of the ODA service request and enable the virtual link to navigate and the control by the Fv of the Lv in the vehicle platoon to the requested location, and in a second instance, continuing to monitor the information broadcast from the ODA server for another ODA service request.

9. The method of claim 8, wherein the value score is based on a cost-benefit using a plurality of weighted factors to determine a cost charge for the Lv to perform the navigation and the control of the Fv to the requested location.

10. The method of claim 9, further comprising:
receiving, by the selection module, the information broadcast from the ODA server that is divided up into one or more route segments for the control and navigation of the Fv to the requested location, and comprises a set of solicited responses associated with the one or more route segments with the cost metric for each Lv to confirm the acceptance of the ODA service request per segment.

11. The method of claim 10, wherein the vehicle platoon is configured with more than one Lv when the set of solicited responses is associated with the one or more route segments to the requested location with the Lvs of the vehicle platoon changed intermittently in accordance with the one or route segments to the requested location.

12. The method of claim 11, wherein the Fv is at least categorized as a level two vehicle with at least capability to communicate with the ODA server, to create the virtual link with the Lv, and to relinquish navigation and the control to the Lv in the vehicle platoon.

13. The method of claim 12, wherein the Lv is at least categorized as the level two vehicle with at least capability to communicate with the ODA server, to create the virtual link with Fv, and to perform the operation of navigating and the control of the Fv to the requested location in the vehicle platoon.

14. The method of claim 13, wherein the virtual link between the Fv and the Lv enables the Fv to simulate a higher level of autonomous driving capability in the vehicle platoon to the requested location by reliance on the Lv for navigation and the control without the Fv having been actually configured with the higher level of autonomous driving capability.

15. An autonomous vehicle configured for a leader vehicle (Lv), comprising:
a processor in communication with an On-Demand Autonomy (ODA) server configured to:
determine whether to confirm a request for an on-demand autonomy (ODA) service which is received via a broadcast by the ODA server to a set of Lvs wherein the ODA service request comprises navigation and control of a follower vehicle (Fv) to a requested location by creating a virtual link between the Lv and the Fv to configure a vehicle platoon to enable transport of the Fv by the Lv wherein the vehicle platoon is a linking of the Lv to the Fv via the virtual link to enable the Lv to assume control of the Fv, and to navigate the Fv to the requested location;
process information broadcast from the ODA server wherein the information broadcast occurs via a distribution protocol to solicit multiple responses from the set of Lvs to create the virtual link between the Lv and Fv wherein each Lv of the set of Lvs independently decides whether to confirm the ODA service request and to create the virtual link with the Fv;
determine a value score independently by the Lv based on the information broadcast that provides a cost metric of an amount provided by the ODA service for the Lv to perform an operation of navigating and the control of the Fv to the requested location wherein the value score is based on a set of factors associated directly with operation of the Lv to the ODA service request, wherein the value score is determined based on an intelligent model that includes a set of weighted factors that comprise overhead operating costs, maneuver complexity requirements for executing the on-demand service request, comfort level of a passenger in accordance with passenger preference, and operation time projected to occur, and a likelihood of a better investment return compared to a past investment return, wherein the selection module determines values of the set of weighted factors based on empirical testing and past history; and decide whether in a first instance, confirm acceptance of the ODA service request and enable the virtual link to navigate and the control by the Fv of the Lv in the vehicle platoon to the requested location, and in a second instance, continue to monitor the information broadcast from the ODA server to wait for another ODA service request.

16. The autonomous vehicle of claim 15, further comprising:

the processor configured to:

receive the information broadcast from the ODA server that is divided up into one or more route segments for the control and navigation of the Fv to the requested location, and comprises a set of solicited responses associated with the one or more route segments with the cost metric for the Lv to confirm the acceptance of the ODA service request per segment.

17. The autonomous vehicle of claim 16, wherein the value score is determined for each of the one or more route segments based on a cost-benefit using the set of weighted factors to determine a cost charge for the Lv to operate the navigation and the control of the Fv for the route segment.

18. The system of claim 1, wherein the intelligent model comprises a utility value model, where each factor comprises a normalized real value, and wherein the utility value model maximizes the value of the utility.

19. The system of claim 1, wherein weights of the set of weighted factors are configured to depend on weather conditions, traffic, and time of day.

20. The system of claim 4, wherein the value score is determined for each of the one or more route segments based on the cost-benefit using the set of weighted factors to determine a cost charge for the Lv to operate the navigation and the control of the Fv for the route segment.

* * * * *